… …

United States Patent [19]

Watanabe et al.

[11] Patent Number: 4,961,884
[45] Date of Patent: Oct. 9, 1990

[54] PROCESS FOR PRODUCING SUBSTRATE OF OPTICAL DISC

[75] Inventors: Seiichi Watanabe; Yusuke Ishihara; Tadashi Irie, all of Kanagawa, Japan

[73] Assignee: Fuji Photo Film Co., Ltd., Kanagawa, Japan

[21] Appl. No.: 387,661

[22] Filed: Jul. 31, 1989

[30] Foreign Application Priority Data

Jul. 29, 1988 [JP] Japan ................... 63-191851

[51] Int. Cl.$^5$ .............................. B29C 45/40
[52] U.S. Cl. ..................... 264/106; 264/335; 249/66.1; 425/351; 425/556; 425/810
[58] Field of Search ............ 264/106, 107, 235, 334, 264/335; 425/810, 351, 556, 405.1, 139; 249/66.1

[56] References Cited

U.S. PATENT DOCUMENTS

| | | | |
|---|---|---|---|
| 4,340,353 | 7/1982 | Mayer | 264/335 |
| 4,381,964 | 5/1983 | Lock | 264/335 |
| 4,500,486 | 2/1985 | Rascle | 264/335 |

*Primary Examiner*—Jay H. Woo
*Assistant Examiner*—Jeremiah F. Durkin, II
*Attorney, Agent, or Firm*—Sughrue, Mion, Zinn, Macpeak & Seas

[57] ABSTRACT

An improved injection molding process for producing a substrate of an optical disc having a high quality is disclosed. The process includes the steps of: fixing a stamper having protrusions corresponding to pits for recorded information or a groove for tracking onto one mold unit of a pair of mold units of an injection molding machine; combining the mold units to form a closed cavity between the pair of mold units; charging a molten molding resin into the cavity; cooling the resin in the cavity to form a molded substrate; separating one mold unit from another mold unit; and releasing the molded substrate simultaneously from both mold units when the two mold units are separated from each other by applying pressurized air onto both sides of the substrate.

6 Claims, 2 Drawing Sheets

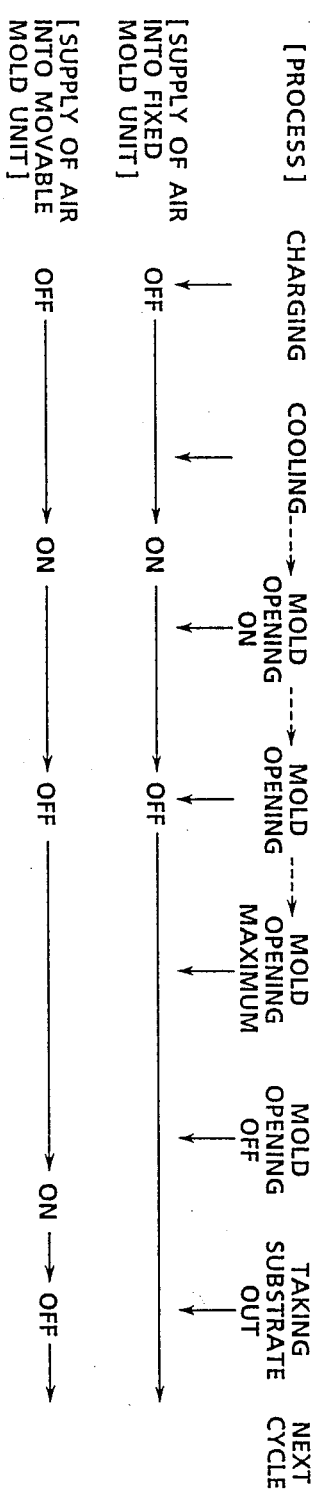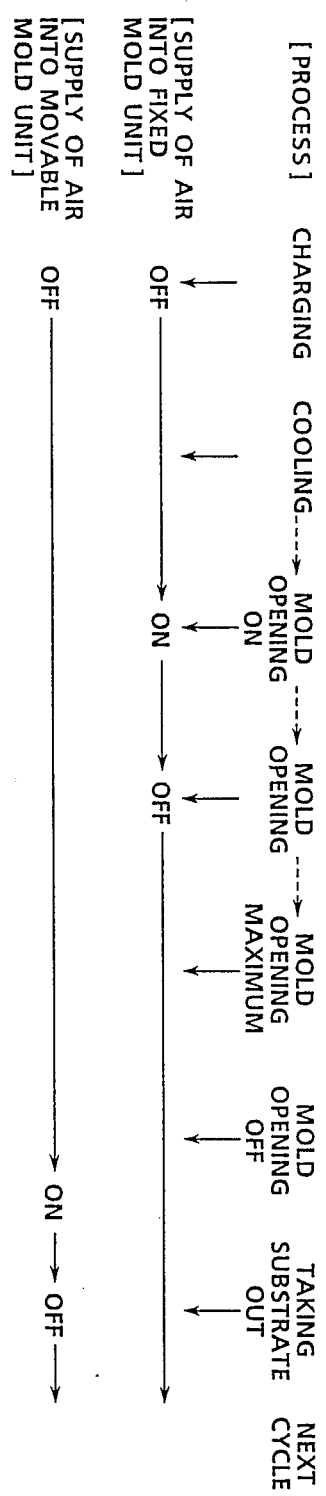

PROCESS FOR PRODUCING SUBSTRATE OF OPTICAL DISC

FIELD OF THE INVENTION

The present invention relates to a process for producing a substrate of an optical disc.

BACKGROUND OF THE INVENTION

An information recording medium for recording and reading information using a high energy density beam such as a laser beam has been developed in recent years and is now being put into practical use. The information recording medium is called an "optical disc" and is employable as video disc, audio disc or disc memory for large-capacity static image files and large-capacity computers.

The optical disc basically comprises a disc-shaped transparent substrate of a plastic material or a glass material and a recording layer provided on the substrate. An undercoating layer or intermediate layer made of a polymer material can be provided on the surface (on which the recording layer is provided) of the substrate for improving smoothness of the surface, adhesion between the substrate and the recording layer and the light sensitivity of the optical disc.

Examples of the optical discs include a disc of the ROM (Read Only Memory) type, a disc of the DRAW (Direct Read After Write) type and a disc of the erasable type.

The discs of the DRAW type and erasable type are generally provided with a groove serving as a tracking guide below the recording layer. A substrate which has not been provided with a recording layer yet and provided with only a groove is called "replica disc". On the other hand, the disc of the ROM type are previously provided with pits for recorded information on the surface of the substrate. The replica disc provided with a groove or the substrate of an optical disc provided with pits can be produced by various molding processes using an injection mold equipped with a stamper such as injection molding, compression molding, and photopolymerization methods. A recording layer is formed on the surface of the replica disc where a groove has been previously formed to obtain an optical disc of the DRAW type or erasable type. Recording of information on the optical disc can be conducted by irradiating the groove or the area between adjoining grooves with a laser beam from the substrate side to form pits or phase-altered portions on the recording layer so as to change optical characteristics of the recording layer. Reproduction of the recorded information from the optical disc can be conducted by irradiating the groove with a laser beam to detect the pits based on variation of the optical characteristics such as reflectance.

The substrates of the above-mentioned optical discs of the ROM type, DRAW type and erasable type are generally produced by an injection molding process. Accordingly, various studies have been made on the processes for producing substrates of such optical discs by the injection molding process.

The injection molding process comprises the step of injecting a molten molding resin into a mold (that is, into a cavity between a set of mold units), cooling the molten resin to form a substrate, and opening the mold to release the formed substrate from the mold.

In more detal. the generally emplyed injection molding process for producing a substrate of an optical disc comprises the steps of fixing a stamper having protrusions corresponding to pits for recorded information or a groove for tracking onto one mold unit of a pair of mold units of an injection molding machine; combining said mold units to form a closed cavity between the pair of mold units; charging a molten molding resin into the cavity; cooling the resin in the cavity to form a molded substrate; separating the mold unit having the stamper from another mold; and releasing the molded substrate from the stamper of the mold unit.

Optical characteristics of an optical disc prepared in an injection molding process for producing a substrate of an optical disc greatly depend on the conditions of the step for releasing the formed substrate. As a releasing step for obtaining a substrate of an optical disc having excellent optical characteristics, generally employed is a releasing step comprises opening the mold (i.e., separating one mold unit having a stamper on its surface from another mold unit) and subsequently supplying pressurized air between the mold surface and the resin substrate formed thereon to release the molded substrate from the stamper.

In the above-mentioned injection molding process for producing a substrate of an optical disc, the copying of the extremely small sized pattern in the form of protrusions corresponding to a pregroove and/or pits on the stamper requires high technique and high skill. Moreover, even if such copying is well made in the injection mold, the molded product should be released from the stamper uniformly in the releasing step for obtaining a substrate of an optical disc having excellent optical characteristics. In the case that the molded substrate is released from the stamper nonuniformly, the obtained substrate of an optical disc easily suffers from releasing nonuniformity (i.e., distortion of shape caused in the course of releasing), cooling nonuniformity (i.e., distortion of shape caused by cooling performed in the releasing step), etc., and hence noticeable non-uniformity of birefringence is produced, resulting in poor optical characteristics of the substrate.

Japanese Patent Provisional Publication 61(1987)-162424 discloses an improvement of the above-mentioned releasing method. In more detail, the publication proposes that a stamper coated with a precious metal such as Ag or Au on its surface is used for improving the release characteristics of the molded substrate from the stamper. However, this method has a disadvantage in that the preparation of the metal-coated stamper is complicated, and further it si difficult to uniformly release the molded substrate from the stamper all over the surface although the release characteristics can be slightly improved.

A reason why the release of the molded product cannot be made uniformly in the conventional releasing step using pressurized air or using a stamper coated with precious metal is to be as follows. When the mold is opened (that is, the mold units are separated from each other), the molded resin substrate is kept on the stamper attached to one mold unit. At that time, the molded substrate and the stamper still have a temperature higher than the surrounding atmospheric temperature. Accordingly, the molded substrate is subjected to different cooling conditions on both sides. In more detail, the molded substrate is slowly cooled on the surface in contact with the stamper, while the substrate is relatively rapidly cooled on the exposed surface (i.e., one surface in contact with the atmospheric air. Therefore, the molded substrate is apt to warp on its plane. In order to avoid occurrence of such warp of the molded substrate, it is generally employed to set temperatures of the mold units differently from each other. However, such difference of temperatures on the mold units is apt to cause a difference of the degree of thermal expansion of the molded substrate between both surfaces. Thus, the known adjustment of the thermal conditions of the mold units is still insufficient to avoid the occurrence of the various nonuniformity of the molded substrate.

SUMMARY OF THE INVENTION

It is an object of the present invention to provide a process for producing a substrate of an optical disc which is reduced in dimensional and optical nonuniformity.

It is another object of the invention to provide a process for producing a substrate of an optical disc which hardly suffers releasing nonuniformity and cooling nonuniformity and shows excellent optical characteristics.

There is provided by the present invention a process for producing a substrate of an optical disc comprising the steps of:

fixing a stamper having protrusions corresponding to pits for recorded information or a groove for tracking onto one mold unit of a pair of mold units of an injection molding machine;

combining said mold units to form a closed cavity between said mold units;

charging a molten molding resin into the cavity;

cooling the resin in the cavity to form a molded substrate;

separating the mold unit having the stamper from another mold unit; and releasing the molded substrate simultaneously from both molds units at the time of the mold separation.

The improvement of the present invention resides in the simultaneous separation of the molded substrate from the two mold units at the same time when the mold is opened, that is, the mold units are separated.

In the process for producing a substrate of an optical disc according to the invention, the molded substrate can be released instantaneously from a pair of mold units (generally consisting of a fixed mold unit, i.e., front mold unit, and a movable mold unit, rear cavity mold unit) at the same time. In accordance with the process of the present invention, the release characteristics of a substrate from the injection mold are improved, and a resin substrate having improved dimensional and optical characteristics is easily obtained.

In other words, since the release of the substrate from both a movable mold unit and a fixed mold unit can be made instantaneously in the process of the invention, there is hardly any cooling nonuniformity or releasing nonuniformity caused by the time lag in the release of the substrate from the two mold units.

Further, both sides of the molded substrate, namely, the stamper side and the other side of the substrate, can be released from the two mold units at the same time, so that the cooling conditions after the release procedure becomes almost the same on both sides, whereby occurrence of warp of the substrate can be reduced even if a temperature difference is not present between the fixed mold and the movable mold. Dimensional differences between the fixed mold unit and the movable mold unit caused by the difference of thermal condition can be made smaller, and hence unfavorable contact between both mold units or between the fixed mold unit and the stamper unit on a movable mold unit hardly occurs, resulting in reduction of abrasion of those mold units.

Accordingly, a substrate of an optical disc produced by the process of the invention has a uniform shape and shows excellent optical characteristics such as less occurrence of nonuniformity in polarization and birefringence owing to the above-mentioned reduced releasing and cooling nonuniformity.

BRIEF DESCRIPTION OF THE DRAWINGS

FIG. 2 is a view illustrating steps of a conventional injection molding process for producing a substrate of an optical disc.

FIG. 3 is a view illustrating steps of the injection molding process for producing a substrate of an optical disc according to the invention.

DETAILED DESCRIPTION OF THE INVENTION

Figure 1:
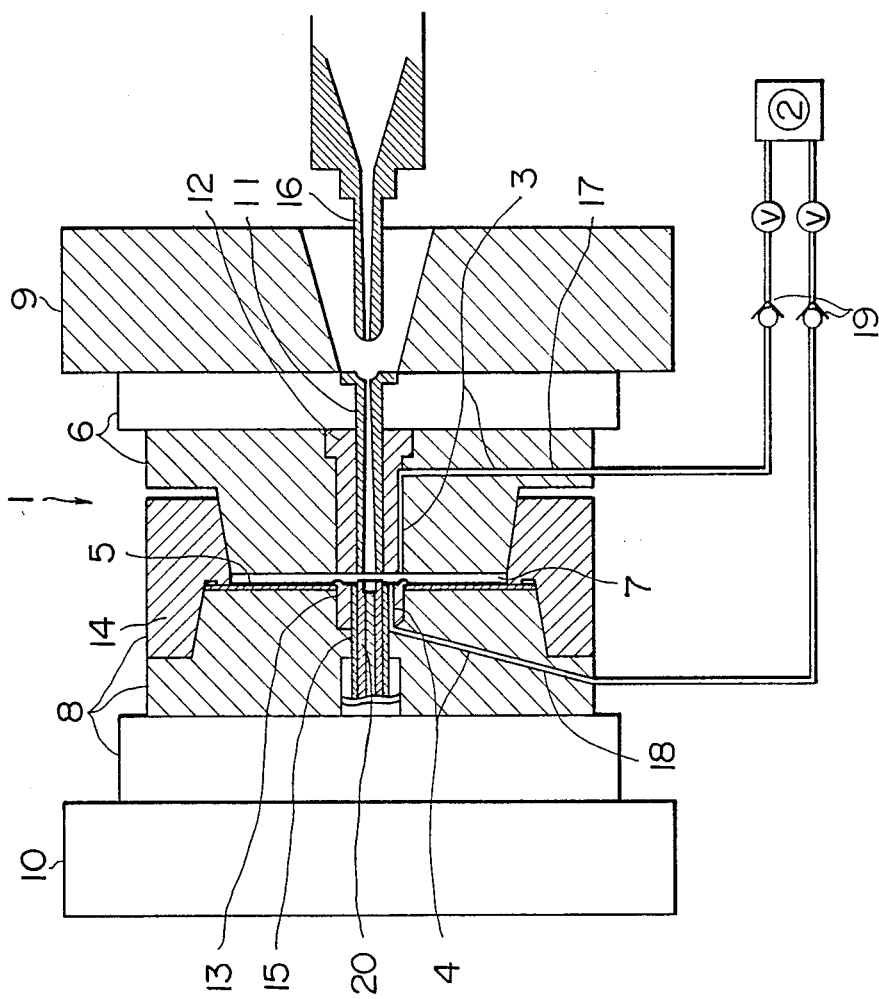
FIG. 1 is a sectional view illustrating an injection mold used in the process for producing a substrate of an optical disc according to the invention.

A representative embodiment of the processes for producing a substrate of an optical disc according to the invention is described in detail with reference to FIGS. 1 to 3 on the attached drawings.

FIG. 1 is a sectional view schematically illustrating an injection mold used in the process of the invention.

The injection mold 1 comprises a fixed mold unit 6 attached to a fixed mold unit mount 9 and a movable mold unit 8 attached to a movable mold unit mount 10, and on the movable mold unit side of a cavity formed between the fixed mold unit 6 and the movable mold unit 8 is provided an inner-side stamper-holding member 13 and an outer-side stamper-holding member 14 to hold a stamper 5 having protrusions corresponding to pits of recorded information and groove thereon. The stamper 5 is held by those stamper-holding members 13, 14 in such a manner that the surface on which the protrusions are formed faces the side of the fixed mold unit 6. At the center of the movable mold unit 8 is provided a cut punch 20 for gate-cutting and forming a central hole, and on the outer periphery side of the cut punch 20 is provided an ejector sleeve 15 for ejecting the molded product in the releasing procedure. In the central part of the fixed mold unit 6 is provided a sprue bush 11 for introducing a molten resin into the cavity 7. The fixed mold unit 6 has an air passage 3 having its air exit at the center of the cavity 7 for the release of the molded product from the fixed mold unit. Likewise, the movable mold unit has an air passage 4 having its air exit at the center of the cavity 7 for the release of the molded product from the movable mold unit. Each of the air exits of the air passages 3 and 4 has a plan view of ring-shaped gap having an extremely small width on the cavity side. The air passage 3 of the fixed mold unit comprises a gap formed between the fixed mold unit 6 and a fixed side bush 12 fitted to the fixed mold unit and a transverse hole 17 for guiding air to the gap from outside of the mold unit. The air passage 4 of the movable mold unit comprises a gap formed between the inner-side stamper-holding member 13 and the ejector sleeve 15 and a transverse hole 18 for guiding air to the gap from outside of the mold unit. Pressurized air is supplied to those air passages 3, 4 from an air supplying apparatus 2 by way of a valve. A check valve 19 may be provided on each of the air passages 3, 4. The illustrated injection mold 1 per se is already known.

The process for producing a substrate of an optical disc according to the invention can be carried out, for example, using the injection mold 1 as shown in FIG. 1. The present invention will be further described below particularly with respect to the releasing method of the molded substrate, that is a characteristic requisite of the invention, referring to FIG. 2 illustrating steps of the conventional process and FIG. 3 illustrating steps of the process of the invention.

In the process for producing a substrate of an optical disc, in the first place, a stamper 5 is fitted onto the movable mold unit 8 of the injection mold 1 on the side facing the cavity 7, and a molten resin is injected into the cavity 7 by means of the sprue bush 11 provided in the central part of the fixed mold unit 6. When the molten resin is charged in the cavity, the cut punch 20 provided on the inner side of the ejector sleeve 15 of the movable mold unit sticks out to fit into a hole previously having received the sprue bush 11 therein on the fixed mold unit side. This portion cut by the cut punch is a central hole of the resulting substrate. Accordingly, the supply of pressurized air in the releasing procedure is done from the air exit which is a gap formed between the inner-side stamper-holding member 13 and the ejector sleeve 15, that is, the air supply is made from slightly outside the inner periphery of the molded substrate (between 15 mm and 33 mm in the diameter in the case of a substrate of 5.25 inches).

Until the above-mentioned step, the supply of pressurized air into the air passage is not carried out. In the conventional process, molten resin is charged in the cavity and the resin is cooled, then the mold opening and the supply of a pressurized air into the air passage 3 provided in the fixed mold unit 6 are initiated simultaneously, as shown in FIG. 2. In the conventional process, even if pressurized air is supplied into the air passage, introduction of the air into the cavity requires a certain period of time although the period is short, because the pressure within the air passage is the same as atmospheric pressure. Hence, the supply of pressurized air into the cavity is made a little later than the mold opening. After opening the mold, the supply of pressurized air into the air passage 3 is terminated. When the mold is completely opened, pressurized air is supplied into the air passage 4 provided in the fixed mold unit 8 to take out the molded substrate, and at the same time the supply of pressurized air into the air passage 4 is terminated.

The steps of the releasing method of the molded substrate according to the invention, that is a characteristic requisite of the invention, corresponding to the steps shown in FIG. 2 are shown in FIG. 3. As shown in FIG. 3, the supply of air into each of the air passages 3 and 4 provided in the fixed mold unit 6 and the movable mold unit 8, respectively, is initiated after charging the molding resin into the cavity 7 and prior to initiation of the mold opening, that is, between the initiation of cooling procedure of the molding resin in the cavity and the initiation of the mold opening. In the conventional process, the supply of air into the air passage 3 is carried out simultaneously with the mold opening, and also carried out in the fixed mold unit side only. In the process of the invention, however, the supply of air is initiated after the initiation of cooling procedure of the molding resin and prior to the initiation of mold opening, and further carried out not only in the fixed mold unit side but also in the movable mold unit side, whereby the pressurized air filled in the air passages of the fixed unit mold and the movable mold unit is jetted out from both of the air passages into the cavity, so as to release the molded product from both the fixed mold unit and the movable mold unit substantially at the same time. The terms "simultaneously" used herein mean that a difference of time between the release of the molded product from the fixed mold unit and the release thereof from the movable mold unit is within 0.3 second. The supply of pressurized air into each of the air passages 3 and 4 is terminated immediately before the mold opening, simultaneously with the mold opening or after the mold opening. Preferably, the supply of air is terminated before the mold is opened at the maximum level, more preferably simultaneously with the release of the molded substrate. When the mold is opened completely (i.e., at the maximum level), the substrate is taken out of the mold. Preferably, pressurized air is again supplied into the air passage 4 provided in the movable mold unit 8 when the mold is completely opened, and the substrate is taken out of the mold. The supply of pressurized air into the air passage 4 is terminated simultaneously with taking the substrate out.

In the conventional processes including the method shown in FIG. 2, pressurized air is not supplied into the air passage of the movable mold unit in the mold opening procedure, while the release of the molded substrate from the stamper is partially initiated simultaneously with the mold opening. Accordingly, the substrate has a portion released from the stamper and a portion released by the pressurized air. Thus, the releasing nonuniformity of the substrate occurs, and such occurrence causes cooling nonuniformity and polarization nonuniformity of the substrate.

In the present invention, in order to solve the above-mentioned problems, pressurized air is supplied into the air passages 3 and 4 provided in the fixed mold unit 6 and the movable mold unit 8, respectively, prior to the mold opening, to store the pressurized air within those air passages. Then, the stored air is jetted all at once simultaneously with the mold opening by moving the movable mold unit 8 so as to release the substrate from the molds. In detail, when a pressurized air is supplied into the air passage prior to the mold opening, the pressure of air within the air passage is increased, because the exit of the air is closed by the molded product (substrate) pressed with a high clamping force. When the clamping of the mold units is loosened to open the exit of the air (i.e., mold opening), the highly pressurized air is jetted to instantaneously release the substrate from the mold units. In this case, the substrate is released from both the fixed mold unit and the movable mold unit at the same time. The supply of air into those air passages is terminated immediately after supplying pressurized air in a sufficient amount required for releasing, preferably simultaneously with the release of the substrate, because the substrate is liable to deviate from the mold in its local position if the air is kept to be supplied after releasing. The release of the molded substrate from the mold units can be detected by checking decrease of the air pressure.

Subsequently, the molded substrate is taken out of the injection mold. In this procedure, it is preferred to supply pressurized air into the air passage 4 provided in the movable mold unit 8, whereby the substrate can be easily taken out of the mold. The air supply for this purpose is terminated simultaneously with injecting an eject sleeve and taking the substrate out. This air supply for easily taking out the molded substrate is not always necessary, and the necessity therefor depends on the kind of an apparatus used for taking out the substrate. The supply of air in the procedure of taking out the substrate is basically performed in the same manner as that of the conventional one, but the pressure and amount of air required therefor can be smaller than those used conventionally, because the substrate has been already released from the mold. Substrates of optical discs can be produced cyclically by repeating the above-mentioned steps as one cycle.

In the releasing method of the molded product (substrate) according to the invention, the supply of pressurized air into the air passage provided in the movable mold unit 8 and the supply of pressurized air into the air passage provided in the fixed mold unit 6, both air supplies being conducted after the initiation of cooling of the resin and before the initiation of the mold opening, are preferably conducted substantially at the same time from the viewpoint of simplicity of the process. However, those air supplies need not always conducted simultaneously, provided that they are conducted after the initiation of the cooling procedure and prior to the initiation of the mold opening. The supply of pressurized air into both of the air passages is terminated simultaneously with the release of the molded substrate or after the release as described above, and particularly, the supply of air into the air passage 4 provided in the movable mold unit 4 is preferably terminated immediately after the release of the molded substrate from the mold, whereby the position of substrate hardly deviates from the mold. In the case that the supply of pressurized air into the air passage of the movable mold unit is continued after the mold is completely opened, the deviation of the molded substrate occurs at a rate of approx. 30%.

A check valve is preferably provided in each air passage. It is preferred to provide the check valve in the air passage between the injection mold 1 and the valve as show in FIG. 1. In the case of providing the check valve, the supply of a pressurized air into the air passages of the fixed mold unit and the movable mold unit can be terminated immediately before the mold opening. If the check valve is provided, the amount of pressurized air jetted into the cavity can be defined by the capacity of the air passage between the check valve and the cavity and the air pressure, so that the amount of the pressurized air supplied for releasing the molded product can be set equally in any cycle. Hence, warpage or waviness occurs at almost the same rate on the surface of the substrate in the releasing procedure, whereby the defect rate of the substrates can be reduced.

In the above-described embodiment, the stamper is fitted onto the movable mold unit, but the stamper may be fitted onto the fixed mold unit. Further, the injection molding is used in the embodiment, but any other method can be utilized, provided that the molded product is released from a pair of mold units at the same time. Moreover, the releasing of the molded product is conducted by supplying pressurized air into the air passage prior to the mold opening in the above-mentioned embodiment, but the air need not always supplied prior to the mold opening, provided that the pressurized air is jetted all at once during the mold opening procedure.

Materials of the substrate employable in the invention can be optionally selected from those used for the known information recording media. As substrate materials, preferably employed are synthetic resins such as acrylic resins (e.g., polymethyl methacrylate), vinyl chloride resins and polycarbonate, from the viewpoints of optical characteristics, surface smoothness, processability, handling properties, long-term stability and manufacturing cost. Preferred are polymethyl methacrylate and polycarbonate, and particularly preferred is polycarbonate, from the viewpoints of dimensional stability, transparency and surface smoothness.

In the case of the a substrate of an optical disc of ROM type which has been already provided with signals for reproduction, a reflecting layer is generally provided on the surface of the substrate produced by the process of the invention using the above-mentioned substrate material. On the other hand, in the case of a substrate of an optical disc of the DRAW type or erasable type, a recording layer is generally provided on the surface of the substrate produced by the process of the invention using the above-mentioned substrate material. Thus, an information recording medium (optical disc) can be obtained. On the surface of the substrate where the recording layer is to be provided, an undercoating layer (and/or an intermediate layer) may be provided for the purpose of improving surface smoothness and adhesion between the substrate and the recording layer or preventing the recording layer from being denatured. Further, a protective layer may be provided on other surface of the substrate (surface not facing the recording layer) for enhancing resistance to damage or resistance to moisture.

The examples and comparison examples of the present invention are given below, without limiting the invention.

EXAMPLE 1

As shown in FIG. 1, a stamper 5 having a reversed pattern (in the form of a set of protrusions) of a pattern having a pregroove depth of 800 angstroms and a track pitch of 1.6 $\mu$m thereon was fitted onto a movable mold unit 8 of an injection mold 1, and a polycarbonate resin was injected into a cavity by means of a sprue bush 11 provided in the central part of a fixed mold unit 6 under the following condition.

Condition of Injection Molding

Temperature within heating cylinder: 320° C.
Rotation of screw: 100 r.p.m.
Injection pressure: 950 kg/cm$^2$
Injection time: 1 second
Temperature of mold: 100° C.
Clamping force: 50 t
Cooling time: 8 seconds Then, cooling of the resin was initiated, and supply of pressurized air into the air passages 3 and 4 provided in the fixed mold unit 6 and movable mold unit 8, respectively, was initiated under a pressure of 6 kgf/cm$^2$ for 2 seconds before the mold opening. It was confirmed that the air pressure within both mold units rapidly reduced simultaneously with the mold opening, and the molded product was released from both mold units at the same time. When the mold was opened by 3 mm, the supply of the pressurized air was terminated. Thereafter, when the mold was opened at the maximum level, pressurized air was again supplied into the air passage 4 provided in the movable mold unit 8 under a pressure of 6 kgf/cm$^2$, to take out the molded substrate from the injection mold. The supply of pressurized air into the air passage 4 was terminated simultaneously with taking out the substrate. Thus, a polycarbonate substrate (outer diameter: 130 mm, diameter of central hole: 15 mm, thickness: 1.2 mm, depth of pregroove: 800 angstrom, track pitch: 1.6μm) of an optical disc was obtained.

EXAMPLE 2

The procedures of Example 1 were repeated except for varying the pressure of air to 2 kgf/cm², to produce a substrate of an optical disc.

EXAMPLE 3

The procedures of Example 1 were repeated except for varying the pressure of air to 4 kgf/cm², to produce a substrate of an optical disc.

EXAMPLE 4

The procedures of Example 1 were repeated except for varying the pressure of air to 8 kgf/cm², to produce a substrate of an optical disc.

EXAMPLE 5

The procedures of Example 1 were repeated except for varying the pressure of air to 10 kgf/cm², to produce a substrate of an optical disc.

EXAMPLE 6

The procedures of Example 1 were repeated except for terminating the supply of pressurized air simultaneously with the mold opening instead of terminating the supply of pressurized air when the mold was opened by 3 mm, to produce a substrate of an optical disc.

EXAMPLE 7

The procedures of Example 1 were repeated except for providing a check valve on the way of the air passage between the injection mold 1 and a valve as shown in FIG. 1 and terminating the supply of pressurized air in one second before the mold opening instead of terminating the supply of pressurized air when the mold was opened by 3 mm, to produce a substrate of an optical disc.

COMPARISON EXAMPLE 1

A substrate of an optical disc was produced in the same manner as described in Example 1 except that the following procedures were carried out after charging the polycarbonate resin into the cavity.

After cooling the polycarbonate resin, the supply of pressurized air into the air passage 3 provided in the fixed mold unit 6 was initiated under a pressure of 6 kgf/cm² simultaneously with the mold opening. When the mold was completely opened after terminating the supply of the pressured air, pressurized air was supplied into the air passage 4 provided in the movable mold unit 8 to take out the molded substrate. The supply of pressurized air into the air passage 4 was terminated simultaneously with taking out the substrate.

COMPARISON EXAMPLE 2

The procedures of Example 1 were repeated except for terminating the supply of pressurized air when the mold was opened by 70 mm instead of terminating the supply of pressurized air when the mold was opened by 3 mm, to produce a substrate of an optical disc.

Evaluation of Substrate of Optical Disc

The substrates obtained in the above-mentioned examples were evaluated on appearance, condition of surface waviness, and nonuniformity of polarization according to the following tests.

(1) Appearance

The appearance of the substrate was evaluated through eye observation, and the results are classified as follows.
AA: No irregularity is observed on the surface.
BB: A several numbers of large sized protruded and depressed portions are observed on the surface.

(2) Waviness

The substrate was measured on the size of waviness (depth of the protruded and depressed portion) on the surface using a waviness measuring machine (Flatness Tester, produced by Anritsu Co., Ltd.). The maximum value of the measured values for each substrate is set forth in Table 1.

(3) Nonuniformity of polarization

After the produced substrate was provided with a metal recording layer, the obtained optical disc was observed on the birefringence using a polarizing plate, and the degree of nonuniformity of polarization (difference of density of tone for the surface) was evaluated. The results are classified as follows.
AA: Nonuniformity of polarization is small.
BB: Nonuniformity of polarization is large.

The results of the above-mentioned tests are set forth in Table 1.

TABLE 1

|  | Appearance | Waviness (μm) | Nonuniformity of Polarization |
|---|---|---|---|
| Example 1 | AA | 50 | AA |
| Example 2 | AA | 80 | AA |
| Example 3 | AA | 50 | AA |
| Example 4 | AA | 60 | AA |
| Example 5 | AA | 80 | AA |
| Example 6 | AA | 50 | AA |
| Example 7 | AA | 20 | AA |
| Com. Ex. 1 | BB | 150 | BB |
| Com. Ex. 2 | BB | 100 | AA |

As is evident from the results set forth in Table 1, the substrate of an optical disc obtained in each of Examples 1 to 7 according to the process of the invention showed a good appearance and also had small nonuniformity of polarization and small variation of birefringence. Hence, it was confirmed that releasing nonuniformity or cooling nonuniformity of the substrate hardly took place in the process of the invention.

We claim:
1. A process for producing a substrate of an optical disc, comprising the steps of:
   fixing a stamper having protrusions corresponding to pits for recorded information or a groove for tracking onto a movable mold unit;
   combining said movable mold unit with a fixed mold unit to form a closed cavity having one side closed by said stamper;
   charging a molten molding resin into said cavity;
   cooling said resin in said cavity to form a molded substrate; and separating said movable mold unit from said fixed mold unit while simultaneously applying pressurized air onto both sides of said substrate.

2. The process for producing a substrate of an optical disc as claimed in claim 1, wherein supply of said pressurized air is started after initiating cooling said resin and prior to initiating separating said movable mold unit from said fixed mold unit.

3. The process for producing a substrate of an optical disc as claimed in claim 1, further comprising the step of terminating supply of said pressurized air before said movable mold unit and said fixed mold unit are completely opened to a maximum amount.

4. The process for producing a substrate of an optical disc as claimed in claim 1, further comprising the step of terminating supply of said pressurized air immediately before separating said movable mold unit and said fixed mold unit from one another.

5. The process for producing a substrate of an optical disc as claimed in claim 1, wherein said pressurized air is supplied through air passages formed in each of said movable mold unit and said fixed mold unit.

6. The process for producing a substrate of an optical disc as claimed in claim 5, wherein said pressurized air is supplied into said air passages prior to separating said movable mold unit and said fixed mold unit from one another and terminated prior to separating said movable mold unit and said fixed mold unit from one another, whereby stored pressurized air is jetted all at once when said movable mold unit and said fixed mold unit are separated from one another to release said substrate from said mold units.

* * * * *